US009325591B1

(12) United States Patent
Kum et al.

(10) Patent No.: US 9,325,591 B1
(45) Date of Patent: Apr. 26, 2016

(54) AUTOMATIC ANALYSIS AND QUALITY DETECTION OF MEDIA

(71) Applicant: Google Inc., Mountain View, CA (US)

(72) Inventors: Sang-Uok Kum, Sunnyvale, CA (US); Chen Wu, Mountain View, CA (US)

(73) Assignee: Google Inc., Mountain View, CA (US)

( * ) Notice: Subject to any disclaimer, the term of this patent is extended or adjusted under 35 U.S.C. 154(b) by 398 days.

(21) Appl. No.: 13/730,747

(22) Filed: Dec. 28, 2012

(51) Int. Cl.
G06F 15/16 (2006.01)
H04L 12/26 (2006.01)
(52) U.S. Cl.
CPC ..................................... H04L 43/08 (2013.01)

(58) Field of Classification Search
None
See application file for complete search history.

(56) References Cited

U.S. PATENT DOCUMENTS

2006/0238444 A1* 10/2006 Wang et al. ..................... 345/55
2011/0311147 A1* 12/2011 Pahalawatta et al. .......... 382/197
2013/0057705 A1* 3/2013 Parker et al. .................. 348/184

* cited by examiner

Primary Examiner — Chris Parry
Assistant Examiner — Stephen Houlihan
(74) Attorney, Agent, or Firm — Fenwick & West LLP

(57) ABSTRACT

This disclosure generally relates to systems and methods that facilitate producing one or more reference or non-reference metrics related to media content in a large scale content server, analyzing the metrics in view of one or more evaluation criteria, and generating results indicative of the quality of the media based upon the analysis.

31 Claims, 9 Drawing Sheets

AUTOMATIC ANALYSIS AND QUALITY DETECTION OF MEDIA

TECHNICAL FIELD

This disclosure generally relates to systems and methods that facilitate producing one or more reference or non-reference metrics related to media content in a large scale content server, analyzing the metrics in view of one or more evaluation criteria, and generating results indicative of the quality of the media based upon the analysis.

BACKGROUND OF THE INVENTION

The internet allows individuals and other entities to easily provide content to a large population of content consumers. Vast amounts of content are being published by individuals and entities to content sites, such as social media and social networking sites. For example, individuals with mobile phones can record events and publish videos to a social media site for anyone or a select subset of individuals to view. Furthermore, more formal publishers, such as educational institutions, advertisers, or production companies, produce professional quality content to be published on the same content sites as an individual. Conventionally, received content goes through a formatting process at the content site, such as transcoding, prior to being published. Due to the large quantity of content being published, formatting processes at the content site generally do not include quality checking in order to reduce computational complexity and latency. Furthermore, the variety of content may require many differing metrics to measure quality. Moreover, there is no general consensus on which metric(s) is appropriate for a particular type of content given that each metric has strengths and shortcomings.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the purpose of this summary is to present some concepts related to some exemplary non-limiting embodiments in simplified form as a prelude to more detailed description of the various embodiments that follow in the disclosure.

In accordance with a non-limiting implementation, a content receiving component is configured to obtain a content, a metric generation component is configured to generate at least one quality metric associated with the content; and a content evaluation component is configured to generate a quality report indicative of quality of the content based upon the at least one quality metric.

In accordance with another non-limiting implementation, a content is obtained, at least one quality metric associated with the content is generated, and a quality report indicative of quality of the content based upon the at least one quality metric is generated.

These and other implementations and embodiments are described in more detail below.

DETAILED DESCRIPTION

Overview

Figure 1:
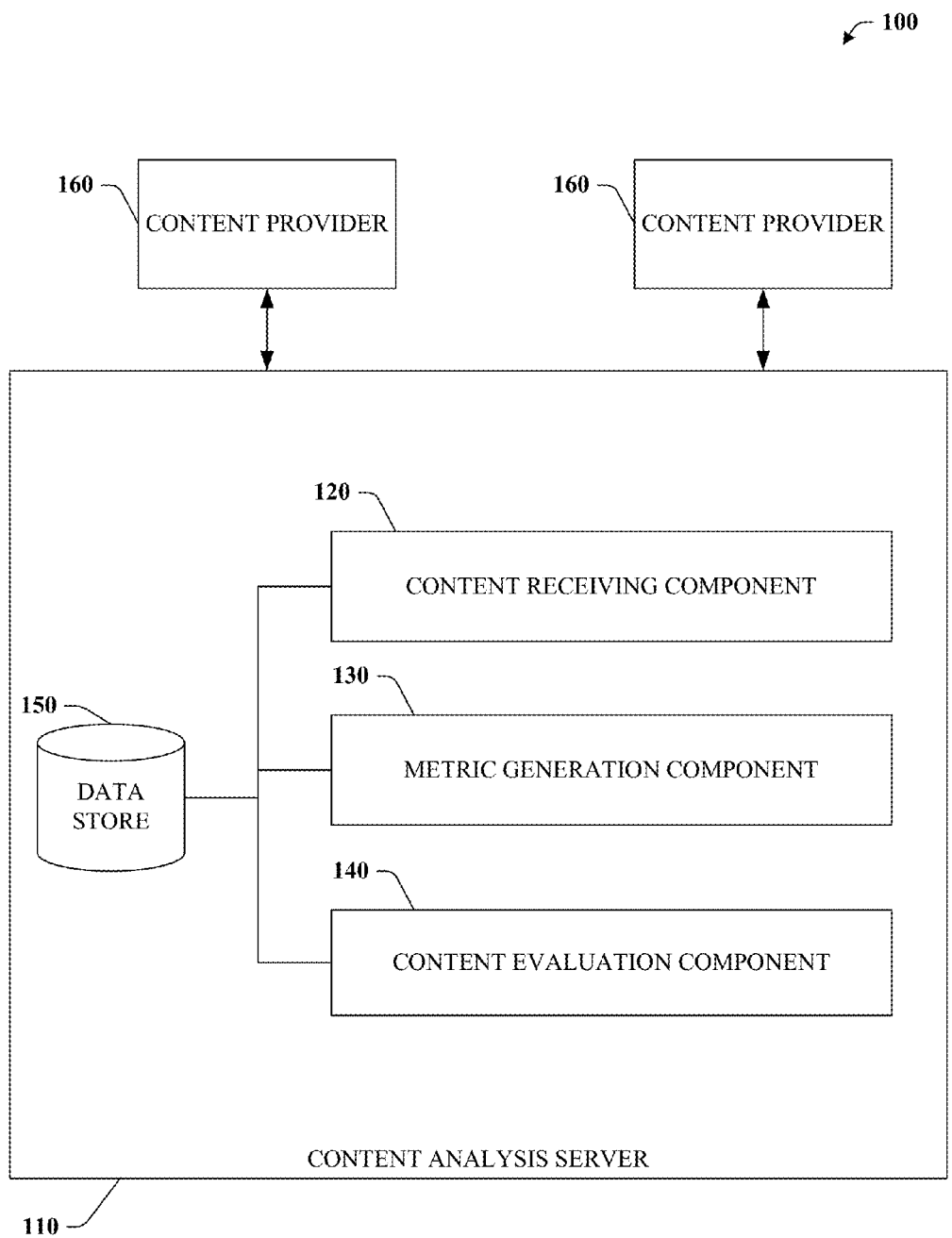
FIG. 1 illustrates a block diagram of an exemplary non-limiting system that analyzes quality of content in accordance with an implementation of this disclosure.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of this disclosure may be practiced without these specific details, or with other methods, components, materials, etc. In other instances, well-known structures and devices are shown in block diagram form to facilitate describing this disclosure.

In situations in which the systems and methods discussed here collect personal information about users, or may make use of personal information, the users can be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. The user can add, delete, or modify information about the user. Thus, the user can control how information is collected about the user and used by a server.

In accordance with various disclosed aspects, a mechanism is provided for a content analysis server to generate reference and/or non-reference metrics (also referred to as "quality metrics"), evaluate quality of content using the quality metrics, and produce results indicative of the quality of the content. Reference metrics are employed for comparing the content ("probe content") to another related content ("comparison content"), for example, a formatted content compared against an uploaded content from which the formatted content is derived. Non-reference metrics do not require comparison of the content against comparison content. In an example, a content site that receives a large quantity of content may make available the content to the content analysis server, prior to or after publishing, for quality evaluation. Content analysis server can make available results indicative of quality for individual media content or aggregated for a plurality of media content. In a non-limiting example, the results can be employed, for example, to adjust a formatting process to improve content quality, or to determine whether content should be published or reformatted.

Content (or content item) can include, for example, video, audio, image, text, or any combination thereof, non-limiting examples of which include, music, speeches, cartoons, short films, movies, televisions shows, documents, books, magazines, articles, novels, quotes, poems, titles, subtitles, comics, advertisements, presentations, photos, posters, prints, paintings, artwork, graphics, games, applications, tickets, coupons, any other creative work that can be captured and/or conveyed through video, audio, image, text, or any combination thereof. Content can be available on an intranet, internet, or can be local content.

With reference to the embodiments described below, an example content site with video content is presented for illustrative purposed only. It is to be appreciated that any suitable type of content can be employed.

Referring now to the drawings, FIG. 1 depicts a system 100 that analyzes quality of content. System 100 includes a content analysis server 110 that receives or accesses content from a plurality of content providers 160 and analyzes quality of the content. It is to be appreciated that content analysis server 110 can concurrently perform analysis of quality of any number of content from any number of content providers 160. Furthermore, content analysis server 110 and content providers 160 can receive input from users to control interaction with and presentation of content and associated information, for example, using input devices, non-limiting examples of which can be found with reference to FIG. 9.

Figure 9:
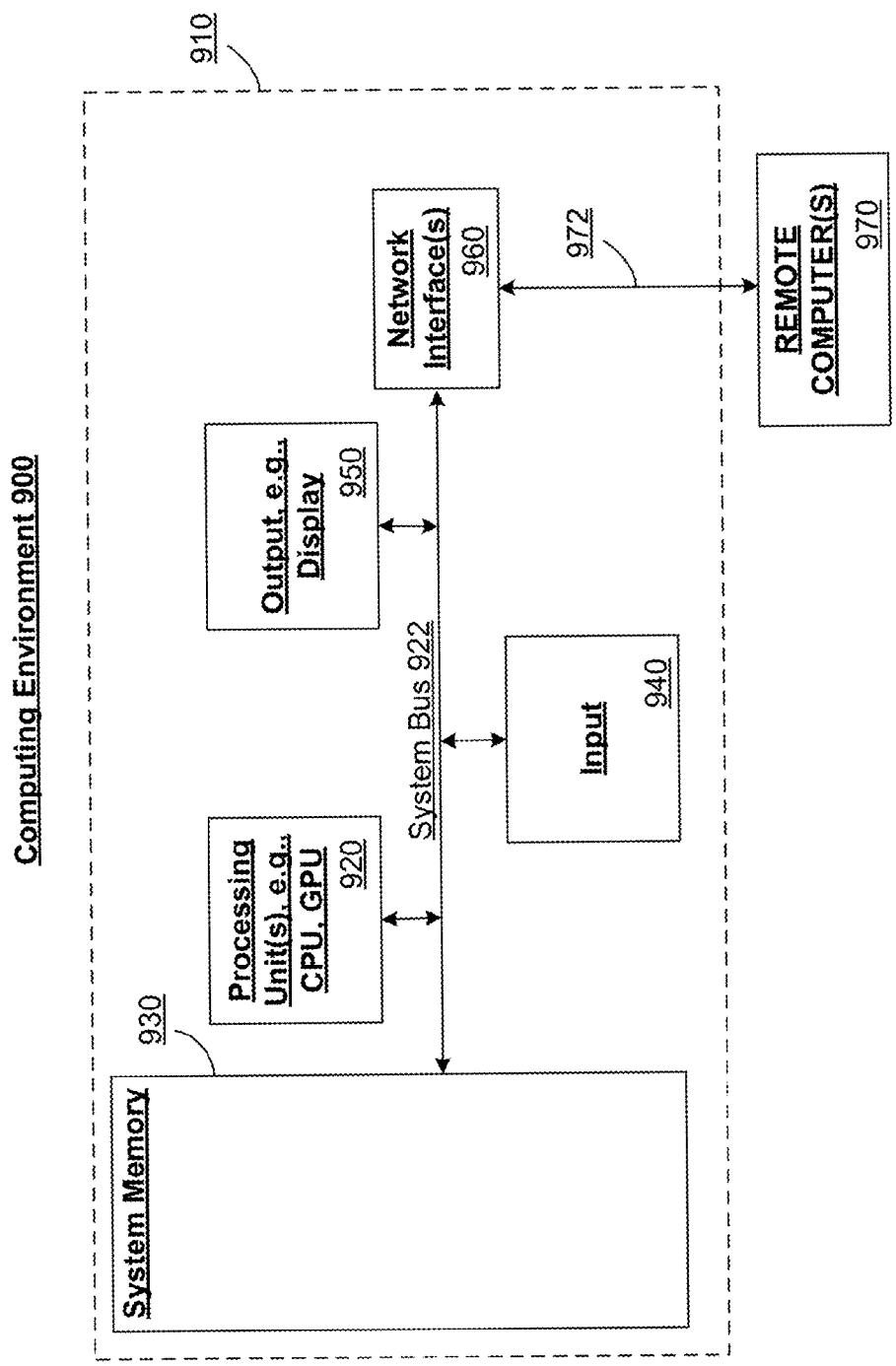
FIG. 9 illustrates a block diagram of an exemplary non-limiting computing system or operating environment in which the various embodiments can be implemented.

Content analysis server 110 and content provider 160, each respectively include a memory that stores computer executable components and a processor that executes computer executable components stored in the memory, a non-limiting example of which can be found with reference to FIG. 9. Content provider 160 can communicate via a wired and/or wireless network with content analysis server 110. It is to be appreciated that while only two content providers 160 are depicted, any suitable number of content providers 160 can concurrently interact with content analysis server 110. Moreover, while content analysis server 110 is depicted as separate from content provider 160, it is to be appreciated that content analysis server 110 can be included within content provider 160.

Content analysis server 110 and content provider 160 can be any suitable type of device for interacting with, receiving, or supplying content locally, or remotely over a wired or wireless communication link, non-limiting examples of include a wearable device or a non-wearable device. Wearable device can include, for example, heads-up display glasses, a monocle, eyeglasses, contact lens, sunglasses, a headset, a visor, a cap, a helmet, a mask, a headband, clothing, or any other suitable device that can be worn by a human or non-human user. Non-wearable device can include, for example, a mobile device, a mobile phone, a camera, a camcorder, a video camera, personal data assistant, laptop computer, tablet computer, desktop computer, server system, cable set top box, satellite set top box, cable modem, television set, monitor, media extender device, blu-ray device, DVD (digital versatile disc or digital video disc) device, compact disc device, video game system, portable video game console, audio/video receiver, radio device, portable music player, navigation system, car stereo, or any other suitable device. Moreover, content analysis server 110 and content provider 160 can include a user interface (e.g., a web browser or application), that can receive and present displays and content generated locally or remotely.

Content analysis server 110 includes a content receiving component 120 that obtains content for quality analysis. Content analysis server 110 further includes metric generation component 130 that generates quality metrics associated with content. In addition, content analysis server 110 includes a content evaluation component 140 that generates results indicative of quality of content based upon quality metrics. Additionally, content analysis server 110 includes a data store 150 that can store content, as well as, data generated by content receiving component 120, metric generation component 130, content evaluation component 140, or content provider 160. Data store 150 can be stored on any suitable type of storage device, non-limiting examples of which are illustrated with reference to FIGS. 8 and 9.

With continued reference to FIG. 1, content receiving component 120 obtains content from one or more content providers 160. For example, a user can upload content to content provider 160. Content provider 160 can make available the content to content receiving component 120, for example, before formatting, after formatting but before publishing, or after publishing. In a further non-limiting example where reference metrics are to be generated, content provider 160 can supply or make available a version of the content provided by the user ("comparison content") along with a probe version of the content ("probe content") resulting from formatting the comparison content. While probe content generated from a comparison content is one example, it is to be appreciated that probe content does not have to be generated from comparison content. In a non-limiting example, probe and comparison contents provided from two different sources may be obtained from a single content provider 160 or multiple content providers 160. For example, two videos of a scene captured from different angles or different sources may be compared to generate reference metrics, such as to determine which one would be more suitable for publishing. In another example, two videos that were generated from a common video using differing formatting process may be compared to generate reference metrics, such as to determine which formatting process is more suitable for publishing. It is to be appreciated that probe content and comparison content can come from any suitable source and be compared using any suitable quality metrics and evaluation criteria.

Figure 2:
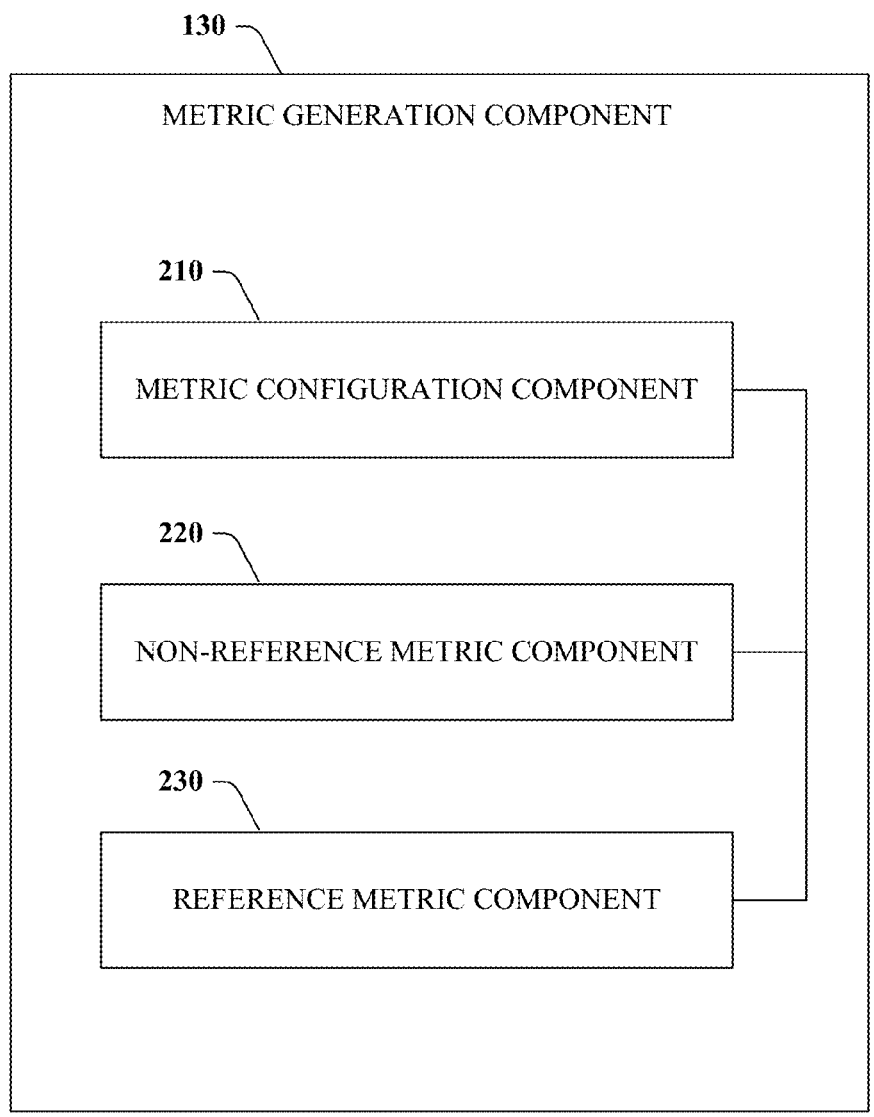
FIG. 2 illustrates a block diagram of an exemplary non-limiting metric generation component that generates quality metrics associated with content in accordance with an implementation of this disclosure.

Referring to FIG. 2, metric generation component 130 generates quality metrics associated with content. Metric generation component 130 includes a metric configuration component 210 that allows for configuration of quality metrics that will be generated. Metric generation component 130 also includes non-reference metric component 220 that generates non-reference metrics associated with content. Additionally, metric generation component 130 also includes reference metric component 230 that generates reference metrics associated with probe and comparison contents. It is to be appreciated that metric generation component 130 can decode and/or encode content as required employing one or more suitable decoders or encoders to prepare content for generation of quality metrics.

With continued reference to FIG. 2, metric configuration component 210 obtains metric configuration information defining quality metrics to be generated by metric generation component 130. For example, a content provider 160 can supply metric configuration information defining quality metrics to be generated for content obtained from the content provider 160. In this manner each content provider can define appropriate quality metrics for their content. In another example, an administrator of the content analysis server 110 can provide metric configuration information that is global to all content providers 160, or specific to one or more content providers 160. It is to be further appreciated that parameters can be set using metric configuration component 210 such that metric configuration information provided by a content provider 160 can override metric configuration provided by the administrator of the content analysis server 110 or vice versa. Additionally, metric configuration component 210 can employ artificial intelligence to infer metric configuration information. For example, metric configuration component 210 can employ quality reports or receive user feedback regarding quality of content and infer metric configuration information that would help improve the quality, such as, by generating quality reports that facilitate preventing poor quality content from being published or identifying adjustments to formatting processes to improve quality.

It is to be appreciated that metric configuration information can define quality metrics for content based upon any data associated with content. For example, content can have associated metadata describing the content, and metric configuration information can define particular quality metrics for respective content based upon any associated metadata. Any suitable metadata can be employed in connection with content. In a non-limiting example, metadata can include type of content, such as music, speeches, cartoons, short films, movies, televisions shows, documents, books, magazines, articles, novels, quotes, poems, titles, subtitles, comics, advertisements, presentations, photos, posters, prints, paintings, artwork, graphics, games, applications, tickets, or coupons. Furthermore, metadata can include location information associated with the content, source of the content, type of device used to generate the content, formatting process employed to generate the content, or filters applied to the content. Additionally, metadata can include video, audio, image, or text parameters of the content. In a non-limiting example, a musical recording can include metadata such as source, title, artist, album, year, track genre, length, composer, lyrics, parental rating, album art, format, bit rate, sampling rate, bits per sample, number of channels, audio codec, etc. One skilled in the art would readily recognize that, based on the type of content, there are well known metadata types that are conventionally associated. However, the information is not limited to only such traditional metadata types. Any type of information can be associated with the content. For example, user comments, likes, dislikes, ratings, tags, and keywords are additional non-limiting examples of information that can be added as metadata to content. Moreover, information can be associated with content automatically by intelligent components, of which non-limiting examples include, image analysis, audio analysis, optical character recognition, facial recognition, object recognition, scene recognition, voice recognition, speech-to-text conversion, and media fingerprint matching.

In a non-limiting example, metric configuration information can specify that videos from individual users will employ a set of reference metrics and a set of non-reference metrics. In another example, metric configuration information can specify that videos from professional publishers will employ a set of non-reference metrics. In a further example, configuration information can specify that videos with subtitles that go through a transcoding process that changes the aspect ratio will employ a reference metric that compares subtitles position. It is to be appreciated that any combination of metadata can be used as conditions for defining any combination of reference and/or non-reference metrics for associated content.

Figure 3:
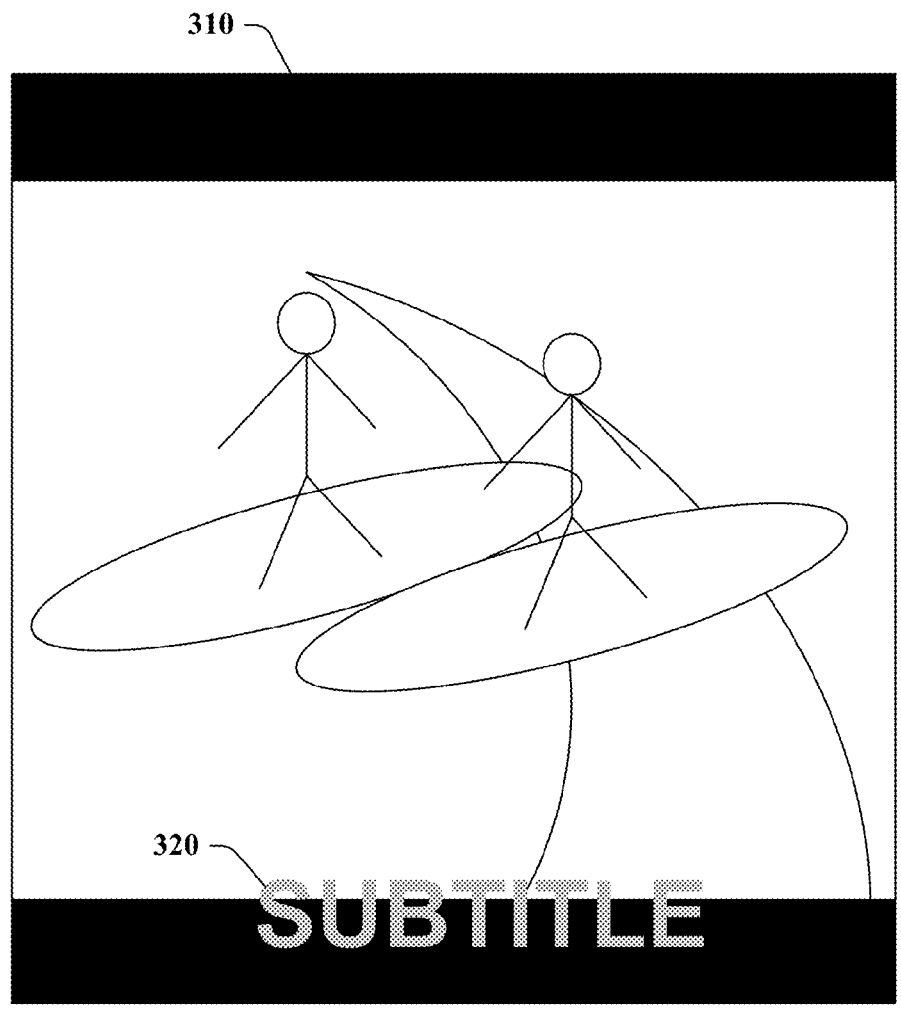
FIG. 3 illustrates an exemplary content in the form of a surfing video in accordance with an implementation of this disclosure.

Continuing with reference to FIG. 2, non-reference metric component 220 generates non-reference metrics associated with content. Non-reference metrics do not require comparison of the content against comparison content. It is to be appreciated that non-reference metrics can include metrics that are generated over the entire content or a sub-portion of the content, such as a plurality of frames, video portion, audio portion, menu, titles, subtitles, a frame, a sub-portion of a frame, or any other suitable sub-portion of content. For example, a non-reference metric can be generated for an entire video content that detects borders of the video, such as consistency of black bars above and below the video image, and/or subtitle positioning. Referring to FIG. 3, is depicted a non-limiting example surfing video 310. A non-reference border metric can be generated by non-reference metric component 220 regarding consistency of the top and bottom black bars throughout surfing video 310. Furthermore, a non-reference subtitle metric can be generated by non-reference metric component 220 indicative of the positioning of subtitles relative to the bottom black bar.

Referring back to FIG. 2, in another example, non-reference metric component 220 can generate a respective non-reference metric for each of a plurality of frames of a video and then generate an aggregated non-reference metric from the respective non-reference metrics generated for the plurality of frames, non-limiting examples of which include peak signal to noise ratio metric (PSNR), structural similarity index (SSIM) metric, and video quality model (VQM) metric. In an additional example, non-reference metric component 220, can generate respective multiple non-reference metrics for each of a plurality of frames of a video and then generate an aggregated non-reference metric from the respective multiple non-reference metrics generated for the plurality of frames, a non-limiting example of which includes a non-reference jitter metric. It is to be appreciated that any non-reference metric can be generated on any portion of content.

Figure 4:
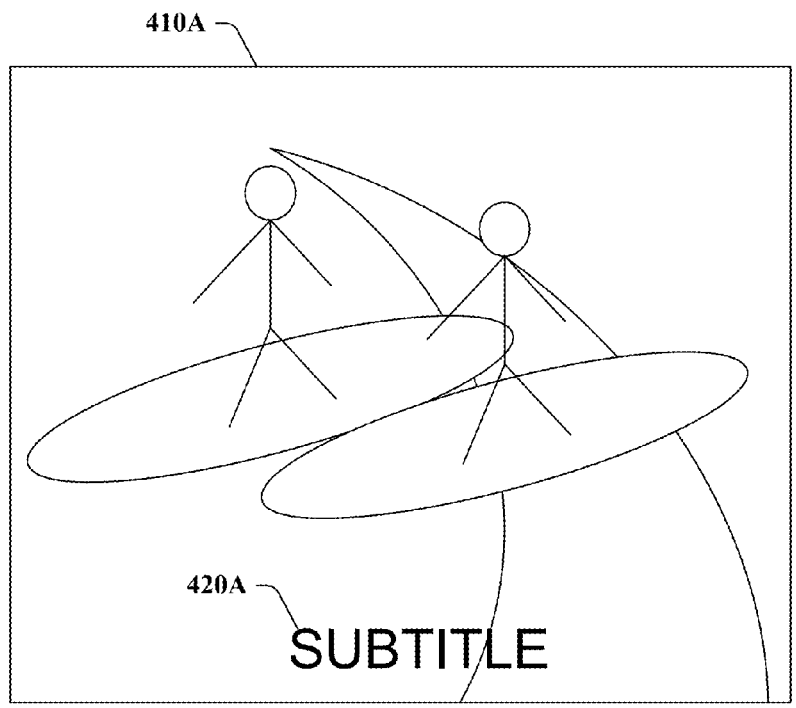
FIG. 4 illustrates exemplary probe and comparison contents in the form of surfing videos in accordance with an implementation of this disclosure.
Figure 4:
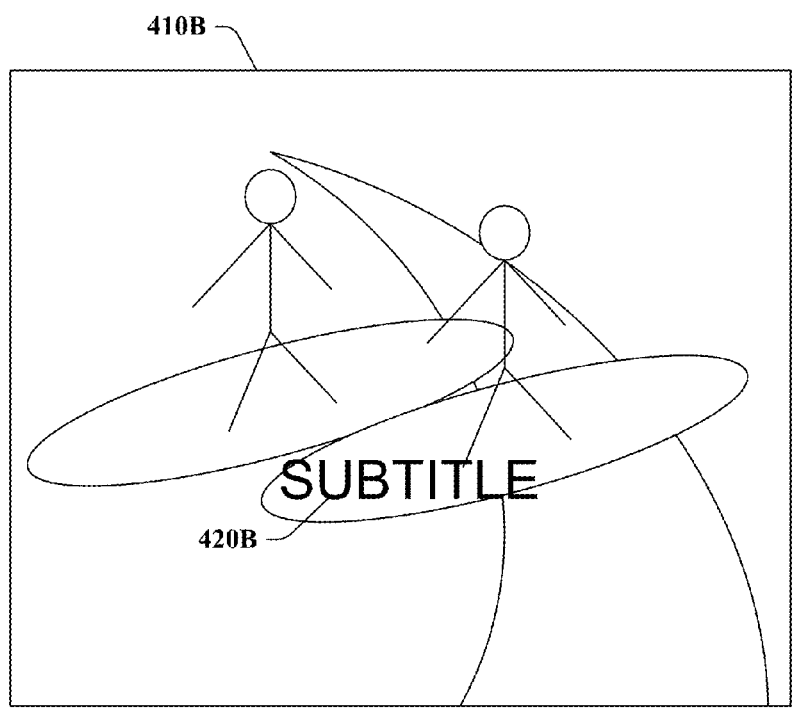

Continuing with reference to FIG. 2, reference metric component 230 generates reference metrics ("probe metrics" and "comparison metrics") related to probe content and associated comparison content. Reference metric component 230 generates one or more probe metrics associated with a probe content, and generates one or more comparison metrics associated with a comparison content related to the probe content. It is to be appreciated that respective probe metrics have corresponding respective comparison metrics that can be employed for comparison in evaluating quality of the probe content and/or comparison content. It is to be appreciated that reference metrics can include metrics that are generated over the entire content or a sub-portion of the content, such as a plurality of frames, video portion, audio portion, menu, titles, subtitles, a frame, a sub-portion of a frame, or any other suitable sub-portion of content. In a non-limiting example, reference border metrics ("comparison border metric" and "probe border metric") can be generated by reference metric component 230 indicating whether a black bar exists above and below the video. In another example, reference subtitle position metrics ("comparison subtitle metric" and "probe subtitle metric") can be generated by reference metric component 230 indicating positioning of subtitles in video content. Referring to FIG. 4, a comparison surfing video 410A and a probe surfing video 410B are depicted. Reference metric component 230 can generate a comparison subtitle position metric for comparison surfing video 410A indicative of the subtitle 420A position and generate a probe subtitle position metric for probe surfing video 410B indicative of the subtitle 420B position as depicted in FIG. 4. In a non-limiting example, probe surfing video 410B may be derived from comparison surfing video 410A through a formatting process. An evaluation of the comparison subtitle position metric and probe subtitle position metric by content evaluation component 140 may indicate that the formatting process caused the subtitle to be incorrectly positioned in probe surfing video 410B. It is to be appreciated that any reference metric(s) can be generated on any portion of content and any suitable type of evaluation employing any evaluation criteria can be performed between probe metrics and corresponding comparison metrics.

Moreover, reference metric component 230 can perform matching to identify corresponding portions of probe and associated comparison contents. For example, reference metric component 230 can identify matching frames temporally between a probe and associated comparison content. In another example, reference metric component 230 can identify matching portions of a frame spatially between a probe and associated comparison content. In a further example, reference metric component 230 can identify matching subtitles between a probe and associated comparison content. In an additional example, reference metric component 230 can identify matching portions of audio between a probe and associated comparison content. It is to be appreciated that reference metric component 230 can match any portion of a probe content and associated comparison content and generate suitable reference metrics on the matching portions.

Reference metric component 230 can also modify portions of probe and/or associated comparison contents. For example, portions of content may need to be modified in order to normalize the probe and comparison metrics. Referring again to FIG. 4, video 410A and 410B may be of differing sizes. Thus, one or both of video 410A and 410B may be modified to adjust pixel format, width, and/or height to normalize positioning information in the probe subtitle position metric and comparison subtitle position metric. In another example, audio portions of a probe or comparison content may be run through an audio filter, such as to remove noise. It is to be appreciated that probe and/or comparison contents can be modified in any suitable manner.

Referencing FIG. 2, content evaluation component 140 can evaluate quality metrics to generate a quality report indicative of quality of content. It is to be appreciated that the quality report can be the quality metric(s), and/or any information associated with or derived from the quality metric(s). For example, content evaluation component 140 can compare a non-reference metric against a non-reference metric threshold. In a non-limiting example, a non-reference border metric can indicate a variance of size of the top and bottom black bars across the entire video of 10 pixels. The non-reference border metric can be compared against evaluation criteria, for example, a non-reference border metric threshold of 3 pixels. Content evaluation component 140 can determine that the non-reference border metric exceeds the non-reference border metric threshold and generate a quality report indicative of this determination. In a non-limiting example, the quality report can include a binary indication whether the non-reference border metric exceeds the non-reference border metric threshold. In another non-limiting example, the quality report can indicate an amount that the non-reference border metric exceeds or is below the non-reference border metric threshold. In another example, the quality report can include the non-reference metric without a comparison to a threshold. Furthermore, any arithmetic operation, logical comparison, formula, function, or algorithm can be performed between the non-reference metric and an evaluation criteria, such as an associated threshold, to generate information in the quality report.

In another example, a plurality of non-reference metrics are evaluated by content evaluation component 140 to generate a quality report for a content. For example, a non-reference border metric and a non-reference subtitle metric as discussed above can be generated for a video each having its own threshold. Content evaluation component 140 can compare the respective non-reference metrics against evaluation criteria, such as associated thresholds. Furthermore, evaluation criteria can include a logical operation to evaluate the plurality of non-reference metrics. For example, evaluation criteria can assess whether a non-reference border metric is within a non-reference border metric threshold and a non-reference subtitle metric is within a non-reference subtitle metric threshold. It is to be appreciated that evaluation criteria can employ any combination of quality metrics with or without associated thresholds using any arithmetic operation, logical comparison, formula, function, or algorithm to generate the quality report.

In a further example, a reference metric for a content is evaluated by content evaluation component 140. For example, a probe metric can be compared against a comparison metric using any arithmetic operation, logical comparison, formula, function, or algorithm to generate an indication in a quality report. In another example, an arithmetic operation, logical comparison, formula, function, or algorithm is performed using the probe metric and comparison metric to generate a result that is compared against an evaluation criteria to generate an indication in a quality report. Additionally, a plurality of reference metrics can be evaluated using evaluation criteria to generate a quality report for a content. It is to be appreciated that any combination of reference and non-reference metrics can be evaluated using any evaluation criteria to generate a quality report. Moreover, the quality report can include metadata associated with the content, probe content, and/or comparison content and can link indications in the quality report associated with the quality metrics to associated metadata. For example, incorrect subtitle positioning can be related to aspect ratio, size, codec, and other metadata. As such, the quality report can link a quality metric associated with subtitle positioning to metadata, such as aspect ratio, size, codec, and other parameters, that influence the quality metric. In another example, a quality report only provides determined values for quality metrics associated with content, such that evaluation can be performed elsewhere, for example, a content provider. It is to be appreciated that the quality report can provide indications of quality using any suitable format, non-limiting examples of which include, binary indications of passing or failing evaluation criteria, raw quality metric data, or data derived from arithmetic operations, logical operations, formulas, functions, or algorithms performed on quality metrics and/or evaluation criteria.

With continued reference to FIG. 2, metric configuration component 210 obtains evaluation criteria to be employed by content evaluation component 140. For example, a content provider 160 can provide evaluation criteria to employ with their metric configuration information. In this manner each content provider can define appropriate evaluation criteria for their quality metrics. In another example, an administrator of the content analysis server 110 can provide evaluation criteria that is global to all content providers 160, or specific to one or more content providers 160. It is to be further appreciated that parameters can be set by metric configuration component 210 such that that evaluation criteria provided by a content provider 160 can override evaluation criteria provided by the administrator of the content analysis server 110 or vice versa. Furthermore, metric configuration component 210 can employ artificial intelligence to infer evaluation criteria. For example, metric configuration component 210 can employ quality reports or receive feedback regarding quality of content and infer evaluation criteria that would help improve the quality, such as, by generating quality reports that facilitate preventing poor quality content from being published or identifying adjustments to formatting processes to improve quality.

Figure 5:
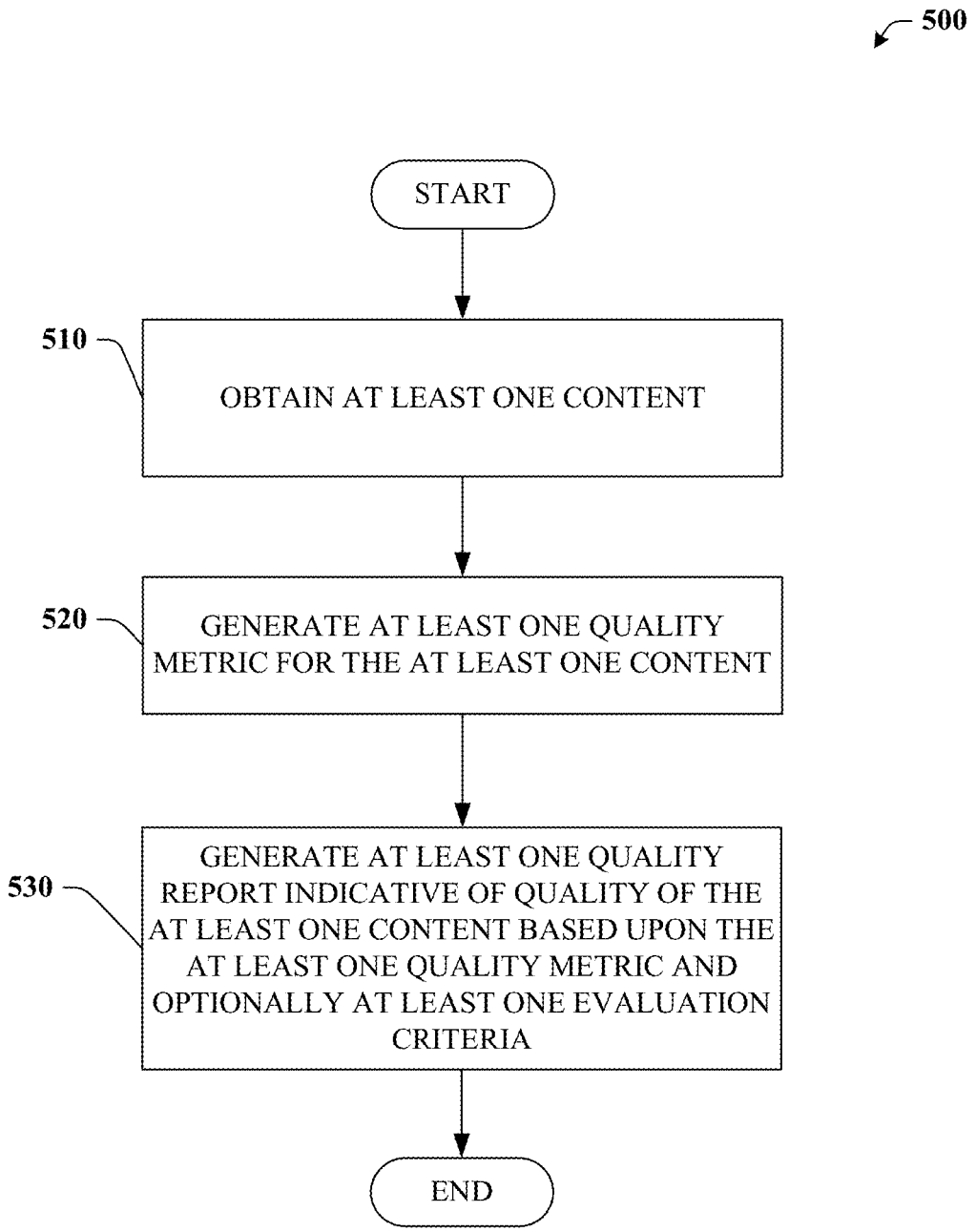
FIG. 5 illustrates an exemplary non-limiting flow diagram for analyzing quality of content in accordance with an implementation of this disclosure.
Figure 6:
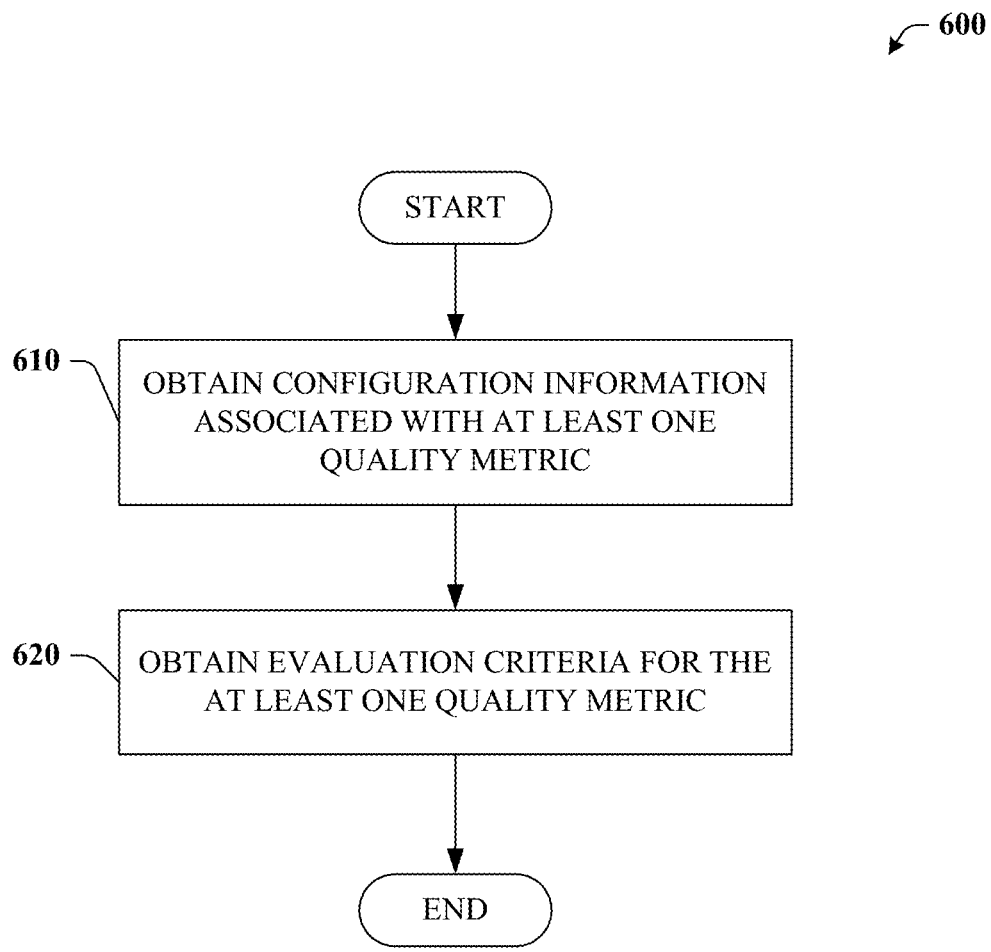
FIG. 6 illustrates an exemplary non-limiting flow diagram for obtaining configuration information and evaluation criteria associated with quality metrics in accordance with an implementation of this disclosure.
Figure 7:
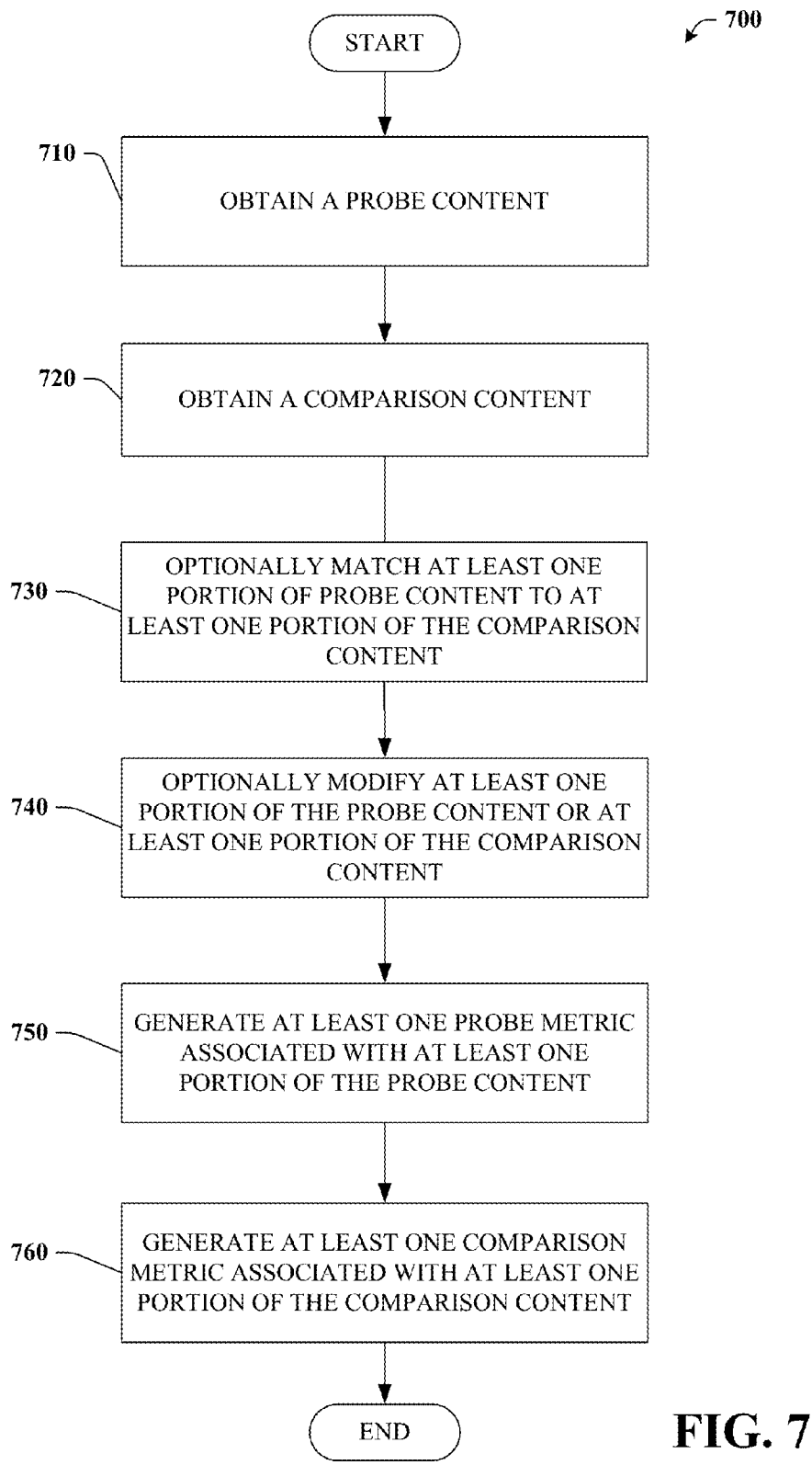
FIG. 7 illustrates an exemplary non-limiting flow diagram for generating reference metrics in accordance with an implementation of this disclosure.

FIGS. 5-7 illustrate various methodologies in accordance with certain disclosed aspects. While, for purposes of simplicity of explanation, the methodologies are shown and described as a series of acts, it is to be understood and appreciated that the disclosed aspects are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with certain disclosed aspects. Additionally, it is to be further appreciated that the methodologies disclosed hereinafter and throughout this disclosure are capable of being stored on an article of manufacture to facilitate transporting and transferring such methodologies to computers.

Referring to FIG. 5, an exemplary method 500 for analyzing quality of content is depicted. At reference numeral 510, at least one content is obtained for quality analysis (e.g. by a content receiving component 120 or content analysis server 110). At reference numeral 520, at least one quality metric is generated for the at least one content (e.g. by a metric generation component 130 or content analysis server 110). At reference numeral 530, at least one quality report is generated indicative of quality of the at least one content based upon the at least one quality metric, and optionally based upon at least one evaluation criteria. (e.g. by a content evaluation component 140 or content analysis server 110).

Referring to FIG. 6, an exemplary method 600 for obtaining configuration information and evaluation criteria associated with quality metrics is depicted. At reference numeral 610, configuration information associated with at least one quality metric is obtained. (e.g. by a metric configuration component 210, metric generation component 130, or content analysis server 110). At reference numeral 620, evaluation criteria associated with the at least one quality metric is obtained. (e.g. by a metric configuration component 210, metric generation component 130, or content analysis server 110).

Referring to FIG. 7, an exemplary method 700 for generating reference metrics is depicted. At reference numeral 710, a probe content is obtained (e.g. by a content receiving component 120 or content analysis server 110). At reference numeral 720, a comparison content is obtained (e.g. by a content receiving component 120 or content analysis server 110). At reference numeral 730, optionally, at least one portion of the probe content is matched to at least one portion of the comparison content (e.g. by a reference metric component 230, metric generation component 130, or content analysis server 110). At reference numeral 740, optionally, at least one portion of the probe content or at least one portion of the comparison content is modified (e.g. by a reference metric component 230, metric generation component 130, or content analysis server 110). At reference numeral 750, at least one probe metric associated with at least one portion of the probe content is generated. (e.g. by a reference metric component 230, metric generation component 130, or content analysis server 110) At reference numeral 760, at least one comparison metric associated with at least one portion of the comparison content is generated. (e.g. by a reference metric component 230, metric generation component 130, or content analysis server 110) It is to be appreciated that a portion can comprise the entire content or a sub-portion of the content. Furthermore, the portions of the probe content at reference numerals 730, 740, and 750 may or may not be the same portions, and the portions of the comparison content at reference numerals 730, 740, and 760 may or may not be the same portions.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 8:
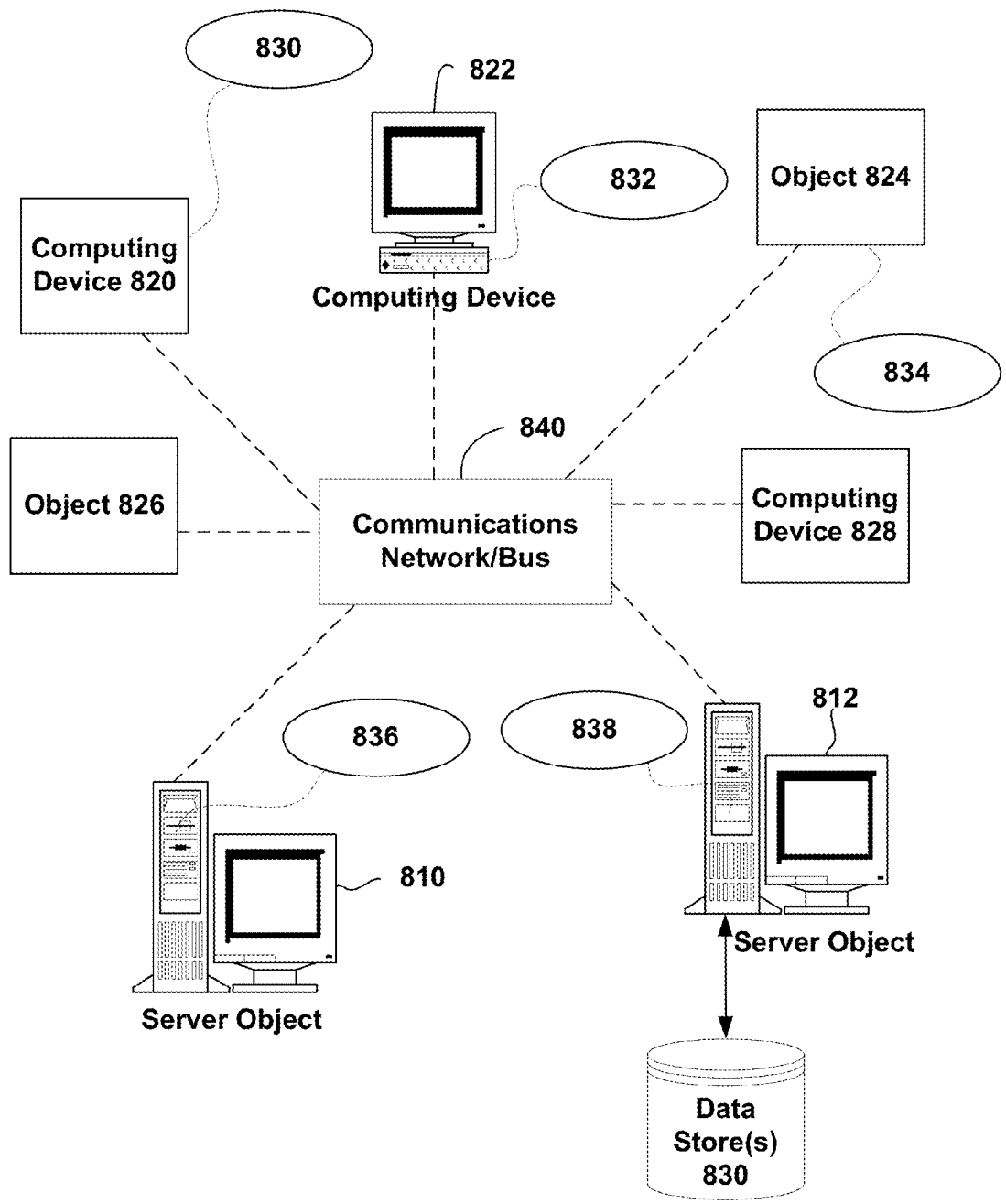
FIG. 8 illustrates a block diagram of an exemplary non-limiting networked environment in which the various embodiments can be implemented.

FIG. 8 provides a schematic diagram of an exemplary networked or distributed computing environment. The distributed computing environment comprises computing objects 810, 812, etc. and computing objects or devices 820, 822, 824, 826, 828, etc., which may include programs, methods, data stores, programmable logic, etc., as represented by applications 830, 832, 834, 836, 838. It can be appreciated that computing objects 810, 812, etc. and computing objects or devices 820, 822, 824, 826, 828, etc. may comprise different devices, such as personal digital assistants (PDAs), audio/video devices, mobile phones, MP3 players, personal computers, laptops, tablets, etc.

Each computing object 810, 812, etc. and computing objects or devices 820, 822, 824, 826, 828, etc. can communicate with one or more other computing objects 810, 812, etc. and computing objects or devices 820, 822, 824, 826, 828, etc. by way of the communications network 840, either directly or indirectly. Even though illustrated as a single element in FIG. 8, network 840 may comprise other computing objects and computing devices that provide services to the system of FIG. 8, and/or may represent multiple interconnected networks, which are not shown. Each computing object 810, 812, etc. or computing objects or devices 820, 822, 824, 826, 828, etc. can also contain an application, such as applications 830, 832, 834, 836, 838, that might make use of an API, or other object, software, firmware and/or hardware, suitable for communication with or implementation of various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any suitable network infrastructure can be used for exemplary communications made incident to the systems as described in various embodiments herein.

Thus, a host of network topologies and network infrastructures, such as client/server, peer-to-peer, or hybrid architectures, can be utilized. The "client" is a member of a class or group that uses the services of another class or group. A client can be a computer process, e.g., roughly a set of instructions or tasks, that requests a service provided by another program or process. A client process may utilize the requested service without having to "know" all working details about the other program or the service itself.

In a client/server architecture, particularly a networked system, a client can be a computer that accesses shared network resources provided by another computer, e.g., a server. In the illustration of FIG. 8, as a non-limiting example, computing objects or devices 820, 822, 824, 826, 828, etc. can be thought of as clients and computing objects 810, 812, etc. can be thought of as servers where computing objects 810, 812, etc. provide data services, such as receiving data from client computing objects or devices 820, 822, 824, 826, 828, etc., storing of data, processing of data, transmitting data to client computing objects or devices 820, 822, 824, 826, 828, etc., although any computer can be considered a client, a server, or both, depending on the circumstances. Any of these computing devices may be processing data, or requesting transaction services or tasks that may implicate the techniques for systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network/bus 840 is the Internet, for example, the computing objects 810, 812, etc. can be Web servers, file servers, media servers, etc. with which the client computing objects or devices 820, 822, 824, 826, 828, etc. communicate via any of a number of known protocols, such as the hypertext transfer protocol (HTTP). Objects 810, 812, etc. may also serve as client computing objects or devices 820, 822, 824, 826, 828, etc., as may be characteristic of a distributed computing environment.

Exemplary Computing Device

As mentioned, advantageously, the techniques described herein can be applied to any suitable device. It is to be understood, therefore, that handheld, portable and other computing devices and computing objects of all kinds are contemplated for use in connection with the various embodiments. Accordingly, the computer described below in FIG. 9 is but one example of a computing device that can be employed with implementing one or more of the systems or methods shown and described in connection with FIGS. 1-8 Additionally, a suitable server can include one or more aspects of the below computer, such as a media server or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 9 thus illustrates an example of a suitable computing system environment 900 in which one or aspects of the embodiments described herein can be implemented, although as made clear above, the computing system environment 900 is only one example of a suitable computing environment and is not intended to suggest any limitation as to scope of use or functionality. Neither is the computing environment 900 be interpreted as having any dependency or requirement relating to any one or combination of components illustrated in the exemplary operating environment 900.

With reference to FIG. 9, an exemplary computing device for implementing one or more embodiments in the form of a computer 910 is depicted. Components of computer 910 may include, but are not limited to, a processing unit 920, a system memory 930, and a system bus 922 that couples various system components including the system memory to the processing unit 920.

Computer 910 typically includes a variety of computer readable media and can be any available media that can be accessed by computer 910. The system memory 930 may include computer storage media in the form of volatile and/or nonvolatile memory such as read only memory (ROM) and/or random access memory (RAM). By way of example, and not limitation, system memory 930 may also include an operating system, application programs, other program modules, and program data.

A user can enter commands and information into the computer 910 through input devices 940, non-limiting examples of which can include a keyboard, keypad, a pointing device, a mouse, stylus, touchpad, touchscreen, trackball, motion detector, camera, microphone, joystick, game pad, scanner, or any other device that allows the user to interact with computer 910. A monitor or other type of display device is also connected to the system bus 922 via an interface, such as output interface 950. In addition to a monitor, computers can also include other peripheral output devices such as speakers and a printer, which may be connected through output interface 950.

The computer 910 may operate in a networked or distributed environment using logical connections to one or more other remote computers, such as remote computer 970. The remote computer 970 may be a personal computer, a server, a router, a network PC, a peer device or other common network node, or any other remote media consumption or transmission device, and may include any or all of the elements described above relative to the computer 910. The logical connections depicted in FIG. 9 include a network 972, such local area network (LAN) or a wide area network (WAN), but may also include other networks/buses e.g., cellular networks.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques described herein. Thus, embodiments herein are contemplated from the standpoint of an API (or other software object), as well as from a software or hardware object that implements one or more aspects described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the aspects disclosed herein are not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In order to provide for or aid in the numerous inferences described herein (e.g. inferring relationships between metadata or inferring topics of interest to users), components described herein can examine the entirety or a subset of the data to which it is granted access and can provide for reasoning about or infer states of the system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x3, x4, xn), to a confidence that the input belongs to a class, as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A system, comprising:
a memory that has stored thereon computer executable components;
a microprocessor that executes the following computer executable components stored in the memory:
a content receiving component configured to receive upload transmissions of a plurality of content from a plurality of content providers via a computer network;
a metric generation component configured to, for ones of the plurality of content:
identify metadata associated with and describing the content;
identify metric configuration information associated with the content;
select at least one quality metric to employ for the content from among a plurality of quality metrics responsive to the metadata and the metric configuration information, the selecting including determining whether the at least one quality metric should include at least one reference metric, at least one non-reference metric, or at least one reference metric and at least one non-reference metric; and
generate the selected at least one quality metric for the content; and
a content evaluation component configured to:
generate a quality report indicative of quality of the content based upon the selected at least one quality metric; and
publish the content to a plurality of content consumers via the computer network based upon the quality report.

2. The system of claim 1, wherein a non-reference metric does not require comparison of the content to a comparison content.

3. The system of claim 1, wherein a reference metric compares the content against at least one comparison content.

4. The system of claim 1, wherein the metric generation component is further configured to generate the at least one reference metric in response to a determination that the at least one quality metric should include the at least one reference metric.

5. The system of claim 1, where the metric generation component is further configured to generate the at least one non-reference metric in response to a determination that the at least one quality metric should include the at least one non-reference metric.

6. The system of claim 1, where the metric generation component is further configured to generate the at least one reference metric and the at least one non-reference metric in response to a determination that the at least one quality metric should include the at least one reference metric and the at least one non-reference metric.

7. The system of claim 1, wherein the metric generation component is further configured to obtain a comparison content related to the content in response to a determination that the at least one quality metric should include the at least one reference metric.

8. The system of claim 7, wherein the at least one quality metric comprises at least one probe metric generated based upon the content and at least one comparison metric generated based upon the comparison metric.

9. The system of claim 8, wherein the metric generation component is further configured match at least one portion of the content to at least one portion of the comparison content prior to generating the at least one probe metric and the at least one comparison metric.

10. The system of claim 8, wherein the metric generation component is further configured to modify at least one portion of the content prior to generating the at least one probe metric or to modify at least one portion of the comparison content prior to generating the at least one comparison metric.

11. The system of claim 1, further comprising a metric configuration component configured to obtain evaluation criteria associated with the at least one quality metric, and wherein the content evaluation component is further configured to generate the quality report further based upon the evaluation criteria.

12. A method, comprising:
receiving, by a system including a processor, upload transmissions of a plurality of content from a plurality of content providers via a computer network;
identifying metadata associated with and describing the content;

identifying metric configuration information associated with the content;

selecting, by the system, at least one quality metric to employ for the content from among a plurality of quality metrics responsive to the metadata and the metric configuration information, the selecting including determining whether the at least one quality metric should include at least one reference metric, at least one non-reference metric, or at least one reference metric and at least one non-reference metric;

generating, by the system, the selected at least one quality metric for the content;

generating, by the system, a quality report indicative of quality of the content based upon the selected at least one quality metric; and publishing the content to a plurality of content consumers via the computer network based upon the quality report.

13. The method of claim 12, wherein a non-reference metric does not require comparison of the content to a comparison content.

14. The method of claim 12, wherein a reference metric compares the content against at least one comparison content.

15. The method of claim 12, further comprising generating, by the system, the at least one reference metric in response to a determination that the at least one quality metric should include the at least one reference metric.

16. The method of claim 12, further comprising generating, by the system, the at least one non-reference metric in response to a determination that the at least one quality metric should include the at least one non-reference metric.

17. The method of claim 12, further comprising generating, by the system, the at least one reference metric and the at least one non-reference metric in response to a determination that the at least one quality metric should include the at least one reference metric and the at least one non-reference metric.

18. The method of claim 12, further comprising obtaining, by the system, a comparison content related to the content in response to a determination that the at least one quality metric should include the at least one reference metric.

19. The method of claim 18, wherein the at least one quality metric comprise at least one probe metric generated, by the system, based upon the content and at least one comparison metric generated, by the system, based upon the comparison metric.

20. The method of claim 19, further comprising matching at least one portion of the content to at least one portion of the comparison content prior to generating the at least one probe metric and the at least one comparison metric.

21. The method of claim 19, further comprising modifying, by the system, at least one portion of the probe content prior to generating the at least one probe metric or modifying, by the system, at least one portion of the comparison content prior to generating the at least one comparison metric.

22. The method of claim 12, further comprising obtaining, by the system, evaluation criteria associated with the at least one quality metric, and generating the quality report further based upon the evaluation criteria.

23. The method of claim 12, wherein identifying metric configuration information associated with the content comprises:

receiving metric configuration information defining quality metrics to be generated for the content from a content provider that provided the content, wherein different content providers provide different metric configuration information for different content.

24. The method of claim 12, wherein identifying metric configuration information associated with the content comprises:

identifying metric configuration information global to content from all of the plurality of content providers.

25. A non-transitory computer-readable medium having instructions stored thereon that, in response to execution, cause a system including a processor to perform operations comprising:

receiving upload transmissions of a plurality of content from a plurality of content providers via a computer network;

identifying metadata associated with and describing the content;

identify metric configuration information associated with the content;

selecting at least one quality metric to employ for the content from among a plurality of quality metrics responsive to the metadata and the metric configuration information, the selecting including determining whether the at least one quality metric should include at least one reference metric, at least one non-reference metric, or at least one reference metric and at least one non-reference metric;

generating the selected at least one quality metric for the content;

generating a quality report indicative of quality of the content based upon the at least one selected quality metric; and publishing the content to a plurality of content consumers via the computer network based upon the quality report.

26. The non-transitory computer-readable medium of claim 25, wherein a non-reference metric does not require comparison of the content to a comparison content.

27. The non-transitory computer-readable medium of claim 25, the operations further comprising generating the at least one reference metric in response to a determination that the at least one quality metric should include the at least one reference metric.

28. The non-transitory computer-readable medium of claim 25, the operations further comprising generating the at least one non-reference metric in response to a determination that the at least one quality metric should include the at least one non-reference metric.

29. The non-transitory computer-readable medium of claim 25, the operations further comprising generating the at least one reference metric and the at least one non-reference metric in response to a determination that the at least one quality metric should include the at least one reference metric and the at least one non-reference metric.

30. The non-transitory computer-readable medium of claim 25, wherein a reference metric compares the content against at least one comparison content.

31. The non-transitory computer-readable medium of claim 25, the operations further comprising obtaining evaluation criteria associated with the at least one quality metric, and generating the quality report further based upon the evaluation criteria.

* * * * *